INVENTORS.
ROBERT W. VANTROBA
EVANS R. BILLINGTON
ROBERT E. POETHIG

ATT'Y.

INVENTORS.
ROBERT W. VANTROBA
EVANS R. BILLINGTON
ROBERT E. POETHIG

ATT'Y.

INVENTORS.
ROBERT W. VANTROBA
EVANS R. BILLINGTON
ROBERT E. POETHIG

ATT'Y.

Aug. 23, 1966    R. W. VANTROBA ETAL    3,268,254
SYRUP TANK AND COVER THEREFOR
Filed Sept. 30, 1965    4 Sheets-Sheet 4

INVENTORS.
ROBERT W. VANTROBA
EVANS R. BILLINGTON
ROBERT E. POETHIG
BY
ATT'Y.

United States Patent Office 3,268,254
Patented August 23, 1966

3,268,254
SYRUP TANK AND COVER THEREFOR
Robert W. Vantroba, Glen Ellyn, and Evans R. Billington and Robert E. Poethig, Glenview, Ill., assignors to The Bastian-Blessing Company, Chicago, Ill., a corporation of Illinois
Filed Sept. 30, 1965, Ser. No. 495,023
20 Claims. (Cl. 292—259)

This application is a continuation-in-part of application Serial No. 323,437, filed November 13, 1963, now abandoned.

This invention relates to a pressure container and closure means therefor, and more particularly to a tank for storing and dispensing a potable liquid and a readily handled tilt-remove cover which safely seals the tank to maintain pressure therein, is easily kept clean and keeps contamination out and away from possible contact with potable substances. The present invention constitutes an improvement upon the invention disclosed and described in the McMahon Patent No. 2,837,367.

By way of illustration and not by way of limitation, a container of the nature described is illustrated in conjunction with the handling of syrups normally dispensed with soda fountains, both at refrigerated and at room temperatures. Preferably the container is provided with a relatively large access opening for ready cleaning and sanitation. For pressurizing the container the access opening is closed by means of a cover which will maintain the pressure within the container yet will be safe to handle physically and for sanitation under all conditions.

In conventional structures the cover member is externally concave or dish-shaped for structural strength against pressure and to provide a guide for ease in locating in properly mounted position. However, sanitation may become a problem with some installations when contaminated substances catch or are held in the concave upper surface and crevices between adjustable functioning parts of the cover and may become mixed with potable fluids through mishandling or difficulty to keep clean.

Further, it is most desirable to equip tank structures with a bail or handle which provides a ready means for safely and conveniently handling and transporting the assembly. The bail or handle preferably serves multiple functions as used in conjunction with a cam to effect sealing of the closure member, release of cam cooperating elements for adjusting the seal tightness of the closure, and releasing the cap securement for its removal in cleaning or filling the tank.

It is, accordingly, an object of this invention to provide an improved container and closure arrangement in which fluids outside the container are dissipated before they collect where they might contaminate potable fluids handled by the container and no corners nor crevices are present to collect contamination which cannot be flushed clean with washing.

Another object of the invention resides in the provision of a tank structure having an access opening sealed at the periphery with a closure member which sheds all liquids contacting it directly to the sides of the container without any contact with the seal and below the level of any openings into the container as long as the cover is in place, whether tight or loosely in place.

A further object is in the provision of a closure member equipped with a bail which, when moved to one predetermined position, will clamp lock the closure member in sealed relationship upon the syrup tank structure; which may be moved into a general vertical plane to provide a carrying handle with no danger to the handler if the container is lifted while pressure is still present, and when moved further to a plane inclined to the vertical and moved edgewise releases the cap for removal and also can release a cam member for adjustment in a clamp tightening direction.

A further object is to provide a closure member for syrup tank structures in which all moving parts and co-operating elements exposed to surrounding environment, either refrigerated or at room temperatures, define closely fitting joints which shed liquids yet are easily handled for adjustment and thorough cleaning.

Still another object is to provide a closure member suitable for use in syrup tank structures in which a tightness adjustment cam is easily set and locked in various positions so that compensation may be made for wear, or for different sizes or heights of mating elements encountered in various tank structures, and an automatic seal against contamination is provided whenever the closure member is resting upon the tank structure.

A further object of the invention is the provision of a cover construction which can be fashioned in metal or plastic including colored plastics for flavor identification.

Yet another object of this invention is to provide a closure which is relatively easy to clean, has a minimum of contamination collecting surfaces, and therefore meets the strict sanitary requirements of the industry. Additional objects and advantages will appear as the description proceeds for the drawings, in which.

Like numerals refer to like parts throughout the embodiments shown in the drawings.

Figure 1:
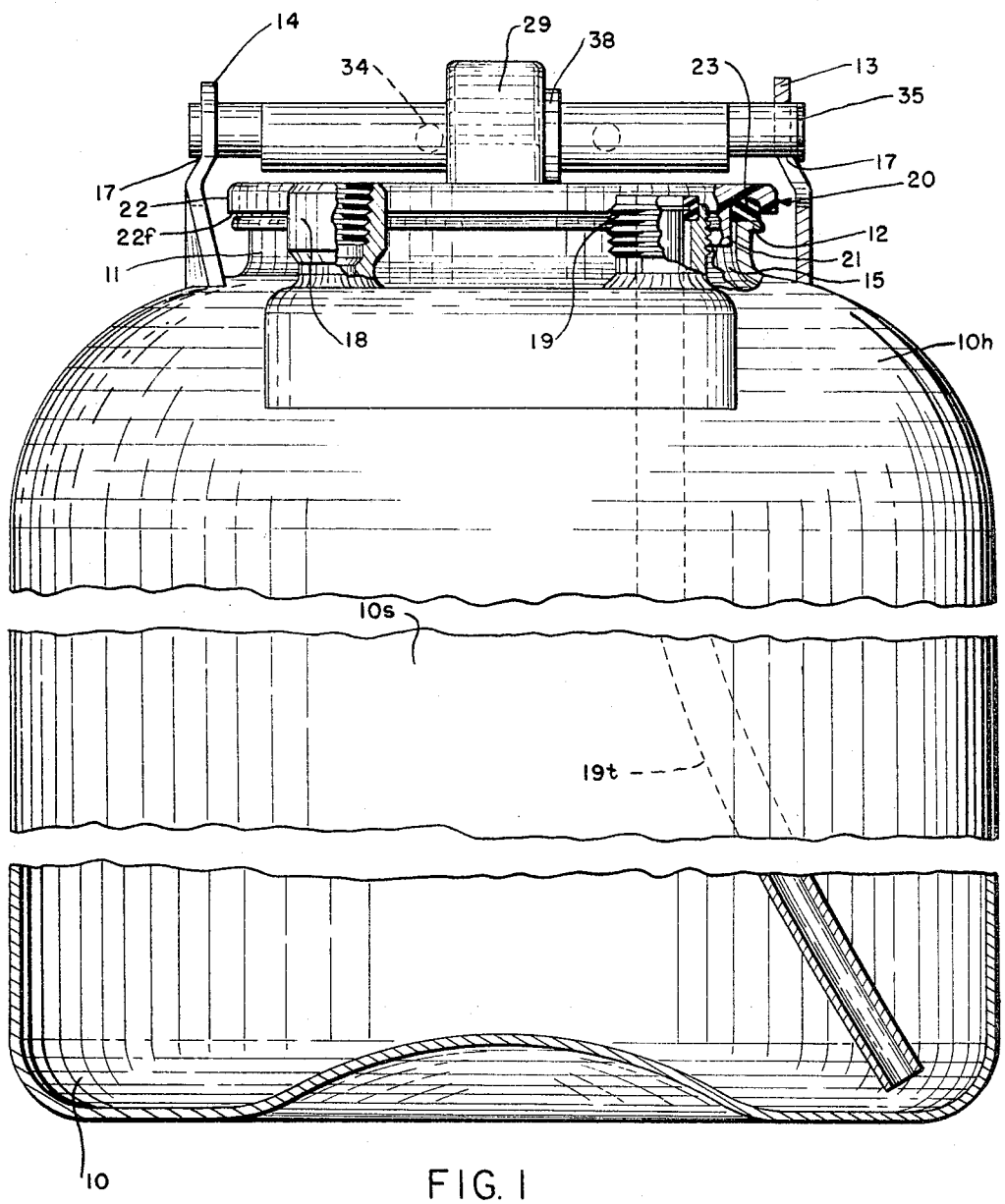
FIG. 1 is a side elevation of a syrup tank and cover therefor embodying the invention.
Figure 5:
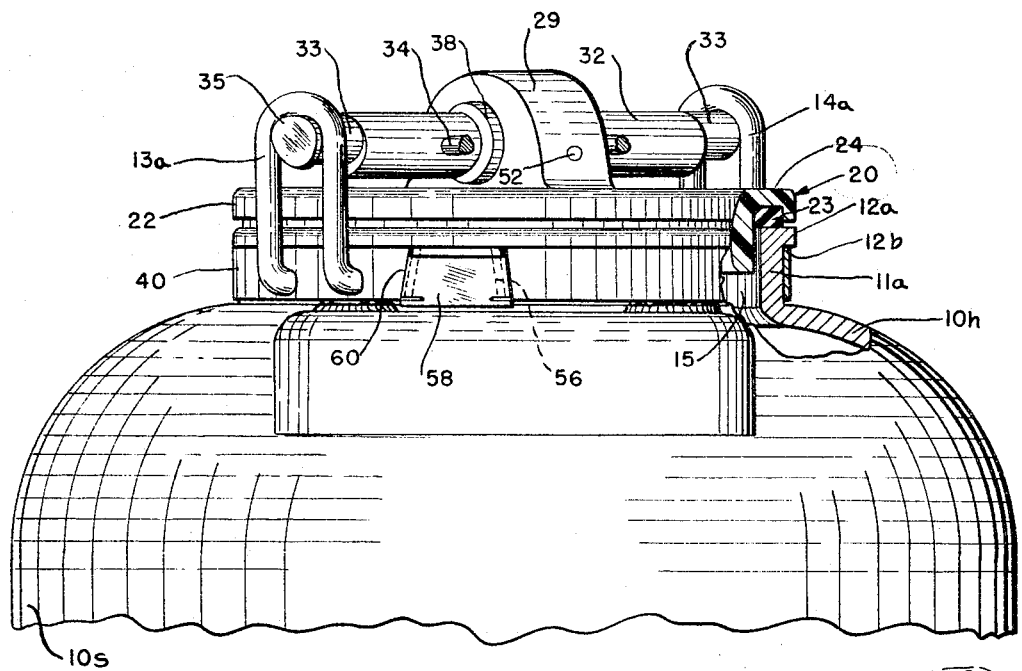
FIG. 5 is a side elevational view, partly in section, of a modification of the embodiment shown in FIG. 1.

Referring now to FIGS. 1 and 5, a tank structure 10 is formed preferably of stainless steel as in FIG. 1, in a cylindrical shape at 10s with sufficient wall strength to withstand the pressures supplied as when used in a soda fountain for the dispensing of flavored syrups and other potable liquids. $CO_2$ gas is applied within the range of 1 to 30 lbs. per square inch and this forces the ejection of liquid from the tank as controlled by a dispensing valve (not shown). The diameter of the tank preferably is a constant dimension and the height of the tank is varied in production to provide different volumes. The tanks when in use are generally stored in a cool space where condensation, viscosity, location and economical use of space are problems and important considerations.

One head 10h of the tank is equipped with an axially extending annular flange 11 and integrated with the sides of the tank. The upper edge of the flange 11 is equipped with a lip 12 which may be rounded to provide a sealing relationship in direct contact with a closure member or as shown in FIG. 5 may be terminally flat and provided marginally with a radial flange 12a presenting a shoulder 12b facing the head 10h with a neck portion or flange 11a between them. A pair of axially extending standards 13 and 14 are rigidly supported with respect to the flange diametrically opposite each other either directly to the head 10h (FIG. 1) or to a ring or band 40 around the flange 11a.

The flange 11 defines a wide mouth opening 15 for access to the interior of the tank for cleaning and inspection. The standards are so located that the vertical portions are spaced a sufficient distance from the flange 11 so that full access for cleaning the tank mechanically through the opening is not hampered. Each of the standards is provided with an opening or eye 17 therethrough and the eyes are diametrically aligned.

Generally, the tank 10 is equipped with connectors 18 and 19, mounted on the flat top of an offset 19c in the head 10h of the tank. One of the connectors, such as connector 19 can be used to educt a liquid such as syrup from the container and the other can be used to introduce a pressurized gas such as carbon dioxide into the container to force the eduction of the syrup. Connector 19 is provided with a flexible tube 19t extending to the other end of the tank. When the tank is used with the head 10h up or horizontal, the connector 19 and the tube 19t are employed for liquid eduction and when the head 10h is down, the connector 18 is used for liquid eduction. In either instance the other connector is connected to a source of $CO_2$ under pressure. The connectors 18 and 19 may otherwise be conventional, being made of stainless steel or brass and chrome plated, it being noted that they are not identical, one being a male member and the other a female member, and the flexible tube is flanged at the connector 19 for ready removal for cleaning while providing a seal when made up with an attached element (not shown).

The access opening 15 is closed by a closure or cover 20 having a top wall 24 convexly conical at a slight angle whereby liquid collecting thereon is shed regardless of what position the tank is in to prevent accumulation of non-sterile liquid thereon. The cover 20 is provided with an annular skirt 21 which telescopes into the opening 15, and a radial flange 22 therebeyond terminating in an annular flange 22f. The flanges provide an annular channel that receives therein a gasket 23 in mating relationship with the lip 12 on the tank head. The gasket 23 is preferably resilient and formed of a material that can be readily sterilized.

In both embodiments (FIG. 1 and FIG. 8), a support member 29 (member 29a in FIG. 8) is centrally located on the upper surface of cover 20 and has extending transversely therethrough a bore 30 and a hexagonal counterbore 28 in which, for purposes of illustration of a relationship to be described, one of the flats of the hexagon is oriented to be parallel with the plane of the lip 12.

Figure 3:
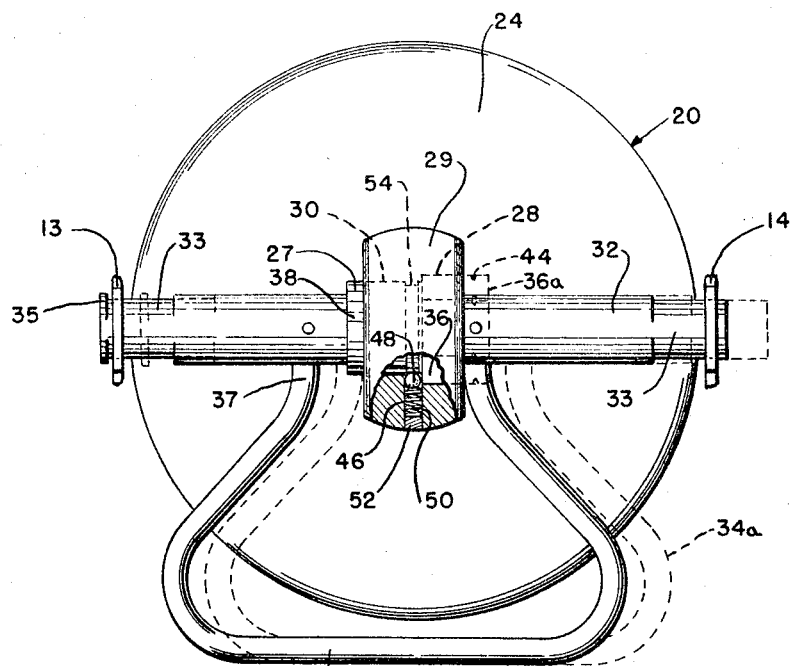
FIG. 3 is a top plan view of the cover shown in FIG. 2 illustrating the alternate positions of the handle.
Figure 4:
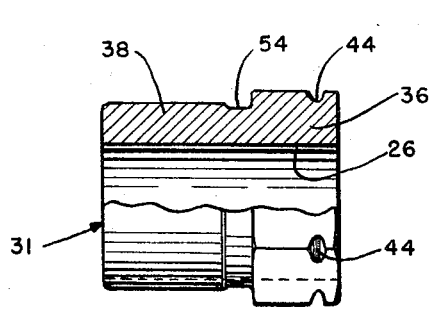
FIG. 4 is a side elevation, partly in section, of one of the elements shown in FIGS. 1-3.
Figure 8:
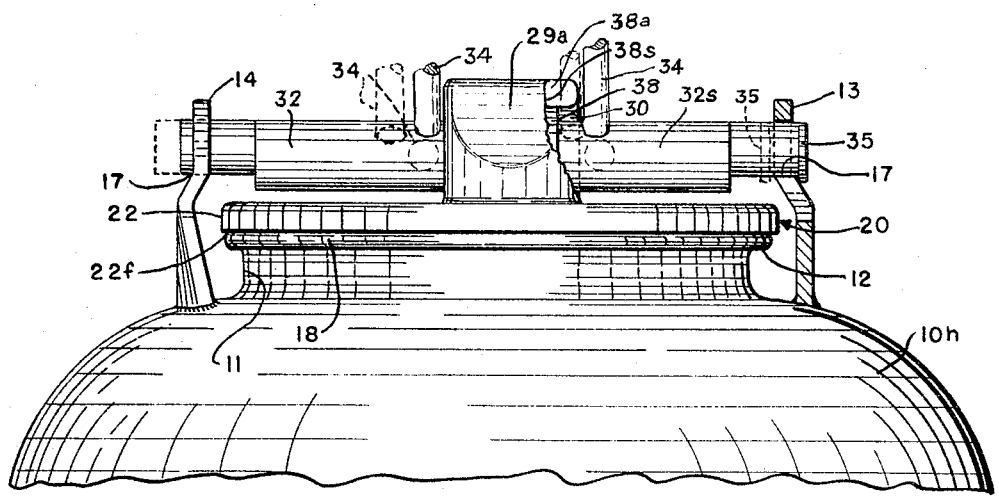
FIG. 8 is a view similar to FIG. 1 illustrating another embodiment of the invention.

Referring now to FIGS. 3, 4 and 8, a sleeve 31, having a hex-head portion 36 and a reduced portion 38, is adjustably received in counterbore 28 and bore 30 and is non-rotatably retained therein in the hexagonal socket-mating relationship in whatever relative position so imposed on the elements. Sleeve 31 is provided with a bore 26 which is eccentric to bore 30 and hexagonal counterbore 28 with the inner dimension of the eccentricity disposed at an angle of 15° to one of the inner radii of the hexagonal configuration. It is to be noted that portion 38 of sleeve 31 is longer than bore 30 in FIG. 1 and upon insertion has a section 27 which protrudes therefrom whereas in FIG. 8 the bore 30a is longer than the sleeve. It should be also noted that hexagonal head portion 36 is provided with notches 44. These elements cooperate for axial movement of the sleeve for rotational adjustment purposes later to be described in connection with the 15° just mentioned. The mating parts fit snugly where exposed to their external environment to prevent contamination by entrance of foreign materials into bore 30 and counterbore 28, yet are readily accessible for cleaning by flushing.

A crossbore 46 is provided in the support member 29 (FIG. 3) intersecting the bore 30 at its junction with counterbore 28 and a spring-pressed ball detent 48 biased by a compression spring 50 is retained therein by a pin 52 to cooperate with an annular groove 54 in sleeve 31 to inhibit inadvertent axial movement of sleeve 31 in bore 30 and counterbore 28. As shown in FIG. 8 this arrangement can be dispensed with in FIG. 8.

Slidably and rotatably mounted within the bore 26 is a shaft or locking bar 32, which as is seen best in FIG. 3, is equipped at both ends with identical cams 33, identically oriented with one end 32s thereof shorter than the other.

Spanning the support member 29 and sleeve 31 is a bail or handle 34 rigidly secured to the shaft 32 for rotating same and shaped to be grasped by a person's hand for carrying the tank or rotating the shaft. The cam end portions 33 of the shaft 32 are eccentric to the axis of the shaft and are adapted to be received within the openings or eyes 17 formed within the standards 13 and 14.

Figure 9:
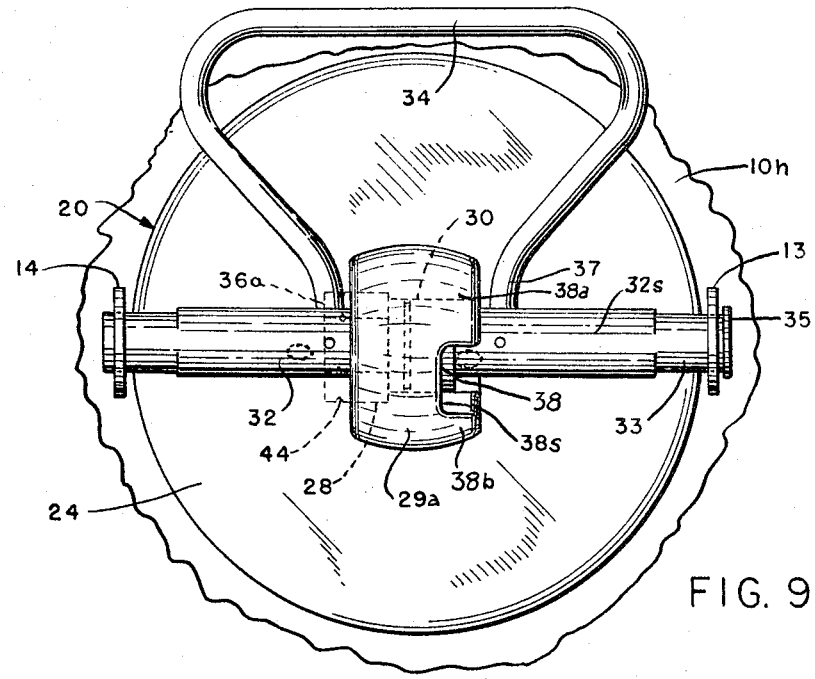
FIG. 9 is a view similar to FIG. 3 showing said other embodiment of FIG. 8.

In FIG. 8 two arcuate land portions 38a and 38b are formed integrally on the side of the support 29 next to the short end 32s of the shaft 32 and are disposed coaxially with the bore 30. As seen in FIG. 9, these lands are not of the same circumferential length above the cover 20 and therefore, the space 38s between their upper ends is located vertically to one side of the top of the support (FIG. 9) 29 circumferentially away from the position of the bail 34 in its operative cover-locking position shown in FIGS. 3 and 9. The space 38s is a recess circumferentially wide enough to receive one of the arms of the bail therein, and is axially deep enough for the arm of the bail to engage and positively displace the sleeve 38 as will be described in connection with the embodiment shown in FIG. 3. In all other rotatable positions of the bail, the edges of the lands prevent removal of the short end 32s of the cam 17 thereon from engagement in the eyelet in the standard 13 engaged thereby. However, the bail can be moved a sufficient distance into the space or recess 38s to clear the cam without disturbing the sleeve 38.

The axial length of the lands 38a and 38b can be provided in relation to the desires of the manufacturer. It can be only enough to protect the sleeve against dislodgement, or preferably long enough as shown to protect against axial disengagement of the cam 33 as well as the sleeve except in one position of the bail at the recess 38s.

Figure 2:
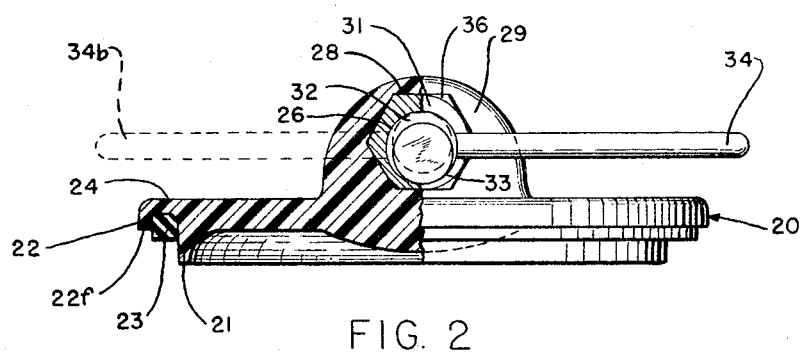
FIG. 2 is a side elevation of the cover shown in FIG. 1 taken at right angles to the plane of the view of FIG. 1 indicating alternate positions of the handle.

In use, after washing and sterilizing the tank and cover parts (10 and 20), the tank can be filled with liquid, whereupon the cover 20 is seated thereon to provide a sealing closure about the access opening 15 with or without rotation of the shaft and the opening is sealed against admission or contamination. This positioning of the cover member 20 upon the annular flange 11 is accomplished by shifting the bail 34 and shaft 32 axially relative to cover 20 as shown in the broken lines in FIG. 3. Thereafter, the resulting long end portion 33 is first slipped through one of the openings 17 provided by one of the standards. In the illustrations shown, it is shown as inserted through the opening in the standard 14. For convenience, the cover member 20 may be tilted angularly during this movement and thereafter the other end of the shaft and cover edge is moved so that the cover 20 is seated upon the flange 11 with the lip 12 thereof engaging the gasket or seal member 23 and the shaft is in alignment with the other one of the openings 17. Then the bail 34 and the shaft 32 to which it is secured are reversely moved axially to the position shown in the solid lines in FIG. 3. In this position it will be evident from FIGS. 1 and 3 that the horizontal eccentric portions 33 of the shaft are each received within one of the eyes 17 in each of the standards 13 and 14. Thereafter, the bail 34 will be swung from the generally horizontal position shown in FIG. 2, 180° to the opposite horizontal position shown by the broken lines.

This swinging movement of the handle or bail 34 is operative to cam the eccentric portions 33 of the shaft 32 into engagement with the walls of the standards 13 and 14 which define the opening 17. The entire cover member 20 then is clamped downwardly by this engagement of the eccentrics and the seal member 23 and annular lip 12 form a fluid-tight seal effective to maintain a considerable pressure within the tank or container 10.

In the event age or use may deteriorate the gasket or seal member 23 and it becomes worn and loose or for any cause some leakage of the pressure within the container may be experienced past the seal, the degree of clamping engagement or tightness of the seal member 23 and lip 12 can be increased to again provide a fluid-tight barrier or seal therebetween by simply rotating the sleeve 31 to raise the eccentric bore 26 and bar 32 contained therein relative to the cover 20. Rotation of sleeve 31 is accomplished after moving the bail 34 to the position shown by the broken lines in FIG. 3 or FIG. 9. In doing this the leg 37 of bail 34 contacts the exposed end section 38 of sleeve 31 and forces it into bore 30 and thereby dislodges the ball 48 from groove 54 and along therewith exposes a segment 36a of the hex 36 on sleeve 31. Notches 44 on the hex 36 are then hand grasped to completely displace the hex portion 36 of sleeve 31 from counterbore 28. Sleeve 31 is now free to be rotated for changing the hex engagement relationship to vary the height of eccentric bore 26 relative to cover 20. This adjustment results in raising the eccentric end portions 33 of the shaft 32 within the openings 17 so that when the bail 34 is swung to locking position, the cover 20 is forced downwardly to a greater extent.

With the major radius of the eccentricity displaced 15° from one of the inner radii of the hexagonal configuration in one mating relationship, it will be observed upon study that relative movement of 60° will accomplish a shift of the cam effect of 45° in one direction and 75° in the other direction from a dead center relationship. Thus, with further shifts six increments of tightness adjustment are provided where four only would otherwise exist. A twelve-notch socket would provide with a hexagonal male member twelve adjustment levels where only seven otherwise would exist. In both instances the adjustment is comparatively micromatic for the positions proximate to the tightness position involved with either a short or a long support. Thereby the cover can be used with different support heights.

In this connection it will be appreciated that any regular polygonal configuration can be used with the displacement angle employed being one-fourth the angle subscribed by one of the faces. However, it is preferred that the male and female configurations be of like number and close fitting as a matter of cleanliness against dangers of contamination, and further it has been found that the hexagonal shape is the least expensive, the easiest to handle and comprehend as well as providing all the adjustment levels required.

In connection with this adjustment it is to be noted that should cover member 20 be made of a resilient plastic material, a certain measure of flexing will occur in the cover between the central support member 29 supporting bar 32 and the radial flange 22 which is supported by the lip 12.

Such flexing in conjunction with the adjustable eccentric bore can provide a cooperating effort affording smaller increments of adjustment.

In use of the bail 34 as a handle for carrying the tank structure 10, the bail is swung to a generally vertical position where it is easily grasped for gripping or carrying. At such time the cover 20 will be in seating relation upon the lip 12 but not clamped, and there is no danger of release of the cover by inadvertent forces tending to shift the bar 32. A shifting under those conditions is either prevented by a raised lip 35 on the extremity of the cam end portion 33 which is at its highest in the carrying position of the bail, or by the long land portion 38a obstructing the bail in vertical position. Lip 35 is eccentric to end portion 33 and protrudes through approximately 180°. (Thus when the bail 34 and bar 32 are in the wide open position in FIG. 3, no obstacle is presented to hinder insertion or removal of the end portions 33 in the eyes 17, yet when the bail is rotated 90° or 180° the lip 35 or land 38a, or both, can act as a safety measure to insure against lateral movement of the bar 32 out of the eyes 17, whereas axial movement of the bail in a predetermined rotationally attained position can be wilfully used to dislodge the sleeve 31 when desired.)

It is seen that the cover member is operative to provide a fluid-tight seal about the access opening of the container 10 whenever the cover is seated upon the lip 12 and the handle or bail 34 is swung to locking position. Thus, even personnel unfamiliar with the structure can always obtain a proper seating and sealing engagement of the cover with the tank and a safe and effective release of pressure before the cover is free to be removed. The bail 34 permits the tank structure to be handled with ease, for the bail can be swung into a vertical position wherein it is in a convenient position for carrying the tank; yet, in this position, there is no danger of the bail shifting laterally so as to release the cover 20.

FIG. 5 shows a further utilization of this invention upon a tank structure molded from polyolefin or polycarbonate plastics which is not equipped with integrated standards. In this application, a band 40 which is equipped with standards 13a and 14a encircles wall 11a on the neck behind the shoulder 12b of the container and is held thereon by protruding lip 12a. Preferably the band 40 is a split ring whose ends are drawn towards each other and the band tightly around the neck by a clamping arrangement which cannot be released as long as the cover is in closure position. Such a means is shown wherein each end of the band or ring 40 is bent back to provide a clip 56. The edges of the ends are then angle cut toward one another and a clamping member 58 with mating slanted clips 60 is forced into engagement with the ring clips drawing both ends together in a band tightening effect. The clamping member is disposed so that removal is not possible when the cover is in place for obvious safety reasons.

Figure 6:
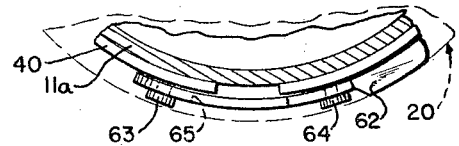
FIG. 6 is a limited top plan view, partly in section, showing certain details of construction of a portion of the embodiment shown in FIG. 5.
Figure 7:
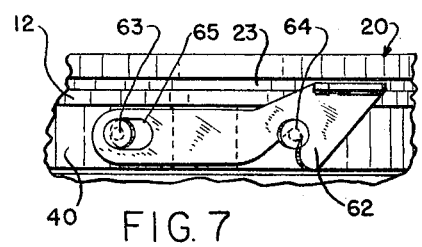
FIG. 7 is a side elevation of the device shown in FIG. 6.

FIGS. 6 and 7 show a further modification of the latching means for retention of the band or ring. In this construction pins 63 and 64 having enlarged heads are mounted one on each end portion of the band. A latching member 62 is provided having an opening 65 and a notch 66. The latch is readily attached to the band by slipping pin 63 through opening 65. The latch is engaged with pin 64 at notch 66 to draw the end portions together.

Preferably the band 40 is substantially thinner than the depth of the flange 12a so that the overhang of both the flange 12a and the cover tend to prevent release of the band when the tank is unpressurized and more particularly when pressure inside the plastic tank further tightens the latching relationship by expanding the neck 11a ever so little.

Having thus described the invention and preferred embodiments thereof, it will be apparent to those skilled in the art how the tank and cover are kept clean in whatever position they may be displaced, how the device is placed in operation, how the objects set forth are attained and how various and further changes can be made therein without departing from the spirit of the invention, the scope of which is commensurate with the appended claims.

What is claimed is:

1. A closure member adapted to sealingly close an opening provided in a tank structure, comprising a cover member adapted to close said opening, a support member secured to said cover member and having a transversely extending first bore therethrough with a portion thereof defining a polygonal contour, said cover member having a non-concave surface substantially flat to inhibit collection of liquid contamination thereon, a sleeve member having a second bore eccentric to said first bore, a portion of said sleeve member having a polygonal contour adapted to lockingly engage the polygonal contour in said first bore, the inner radius of said eccentricity being angularly displaced one-fourth of the angle subtended by a face of said polygonal contour, retaining means carried by said support member engaging said sleeve member for retarding axial movement thereof, a bar and cam ends thereon slidably and pivotally mounted within said second bore and being equipped with a bail that is adapted to engage said support member in one direction of movement to limit axial movement of said bar therefrom, and a pair of spaced-apart standards on said tank supported one on each side of said opening and each being provided with an eye therethrough, said cam ends being adapted to be received within said eyes, one of said cam ends having an axial dimension sufficient to permit removal of the other cam end from the other standard upon axial movement of said bar in a direction away from said first standard, said other cam end having retaining means cooperating with said eyes to limit axial shifting of said bar when said handle is substantially perpendicular to said cover member, said sleeve and eccentric bore affording means in cooperation with said resilient cover member whereby the position of said bar and said cam ends relative to said eyes and the periphery of said closure member is adjustable.

2. The combination called for in claim 1 in which said bail engages said sleeve in a relationship partially disengaging the mating relationship between said polygonal contours, and detent means tending to hold said sleeve and support in a working relationship in which said polygonal contours are fully engaged.

3. A closure device adapted to sealingly close an opening provided in a tank structure, band means removably secured to a neck on said tank structure, releasable means associated with said band means for securing said band means to said tank structure, ears carried by said band means above said opening, a cover member for marginally engaging the tank and overhanging the edges of said opening, said overhang cooperating with said releasable means to prevent releasing of said band means when the cover member is in engagement with the tank, a support member secured to said cover member and having a transversely extending first bore therethrough, a sleeve member slidable and rotatable in the first bore and having a second bore eccentric to the first bore, means for locking said sleeve in said bore in a plurality of relative rotational angular positions, bar means having cam ends thereon slidably and pivotally mounted within said second bore into and out of engagement with said ears and being equipped with a bail, said bail having spaced-apart end portions, one on each side of said support member in normally proximate relation thereto, and means on said bar means to prevent lateral shifting of said bar means when said bail is in an upstanding, carrying position.

4. The combination called for in claim 3 in which said tank is constructed of a polyolefin or polycarbonate plastic and said neck is subjected to internal pressure to expand it against the band to inhibit inadvertent loosening of the band.

5. A closure member adapted to sealingly close an opening provided in a tank structure, comprising a cover member adapted to marginally engage said opening in pressure-tight relationship, a support member rigidly secured to said cover member and having a transversely extending bore therethrough, a sleeve member having a second bore eccentric to the first said bore, cooperating means between said sleeve and said bore for limiting movement of said sleeve therein, a bar having cam ends thereon slidably and pivotally mounted within said second bore and being equipped with a bail, said bail having spaced-apart end portions on each side of said support member in normally proximate relation thereto, and means to prevent lateral shifting of said bar when said bail is in an upstanding carrying position.

6. The combination called for in claim 5 in which the last mentioned means includes an axially extending land upon the support member obstructing axial movement of the bail and bar when the bail is in carrying position.

7. The combination called for in claim 6 in which said cooperating means limits relative rotational movement of the sleeve members therein in one relative axial position and said sleeve has an end portion engaged by axial movement of said bar by said bail.

8. The combination called for in claim 5 in which said sleeve member extends beyond the bore a predetermined distance less than the axial distance of movement of said bar, and the last mentioned means includes a land on said cover member coaxial with said bar for obstructing engagement with said sleeve member by axial movement of said bail and bar when the bail is in said carrying position.

9. The combination called for in claim 5 in which said support member has an axial recess intersecting said bore at one end bordered at the top by a land, and said sleeve member extends axially into said recess for engagement by said bail and bar when said bail is rotatively moved from said carrying position and shifted to the axial bottom of the recess to engage and displace said sleeve member.

10. The combination called for in claim 5 in which said support member includes a plurality of axially disposed circumferentially spaced lands bordering said bore defining between their adjacent ends an axial recess whose center line is disposed at an angle to the carrying position of said bail, and said sleeve extends into the axial bottom portion of said recess for engagement by said bail when same is disposed at said angle.

11. The combination called for in claim 10 in which said disengageable means includes axial land elements carried by said support member extending axially the space remaining between the support and said spaced bail portions circumferentially over the major portion of their rotational movement and defining between them a recess extending axially to the adjacent end of said bore to admit said bail into engagement with said protruding sleeve portion to displace it when said bail is in other than its carrying position.

12. A closure member adapted to sealingly close an opening provided in a tank structure, comprising a cover member adapted to marginally engage said opening in pressure-tight relationship, a support member rigidly secured to said cover member and having a transversely extending bore therethrough, a sleeve member having a second bore eccentric to the first said bore, cooperating means between said sleeve and said first bore for limiting movement of said sleeve therein, including a counterbore at one end of the first bore through the support member and a head portion on the sleeve member at one end received in said counterbore flush with said support member, said sleeve member being longer than said bore to protrude therefrom at its other end, a bar having cam ends thereon slidably and pivotally mounted within said second bore and being equipped with a bail, disengageable means to prevent lateral shifting of said bar when said bail is in an upstanding, carrying position, said bail having end portions on each side of said support member in normally proximate relation thereto and spaced apart a distance greater than the length of the sleeve to engage and displace said protruding sleeve member when the last mentioned means is disengaged.

13. A closure device adapted to sealingly close an opening provided in a tank structure, band means removably secured to a neck on said tank structure, releasable means associated with said band means for securing said band means to said tank structure, ears carried by said band means above said opening, a cover member for marginally engaging the tank and overhanging the edges of said opening, said overhang cooperating with said releasable means to prevent releasing of said band means when the cover member is in engagement with the tank, a support member secured to said cover member and having a transversely extending first bore therethrough, a sleeve member protruding beyond said first bore at one end and being slidable and rotatable in the first bore, said sleeve member having a second bore eccentric to the fiirst bore, means for locking said sleeve in said bore in a plurality of relative rotational angular positions, bar means having cam ends thereon slidably and pivotally mounted within said second bore and movable into and out of engagement with said ears and being equipped with a bail means, said bail means having an end portion in normally proximate relation to said sleeve member for engaging the protruding sleeve member to displace it when said bar means is laterally shifted in said second bore to disengage said ears, and means on said bar means to prevent lateral shifting of said bar means when said bail is in an upstanding, carrying position.

14. A closure member adapted to sealingly close an opening provided in a tank structure, comprising a cover member adapted to close said opening, a support member secured to said cover member and having a transversely extending first bore therethrough with a portion thereof defining a polygonal contour, a sleeve member having a second bore eccentric to said first bore, said sleeve member having a portion defining a polygonal contour adapted to engage the polygonal contour in said first bore in locking relation against rotation and another portion extending beyond said first bore, the inner radius of said eccentricity being angularly displaced one-fourth of the angle subtended by a face of said polygonal contour, a bar and cam ends thereon slidably and pivotally mounted within said second bore and being equipped with a bail that is adapted to engage said support member in one direction of movement to limit axial movement of said bar therefrom and to engage the other portion of said sleeve member to displace it in the other direction of movement, and a pair of spaced-apart standards on said tank supported one on each side of said opening and each being provided with an eye therethrough, said cam ends being adapted to be received within said eyes, one of said cam ends having an axial dimension sufficient to permit removal of the other cam end from the other standard upon axial movement of said bar in a direction away from said first standard, said other cam end having retaining means cooperating with said eyes to limit axial shifting of said bar when said handle is substantially perpendicular to said cover member, said sleeve and eccentric bore affording means in cooperation with said resilient cover member whereby the position of said bar and said cam ends relative to said eyes and the periphery of said closure member is adjustable.

15. The combination called for in claim 14 in which said bail engages said sleeve in a relationship partially disengaging the mating relationship between said polygonal contours, and said polygonal contour on said sleeve member has manually engageable means exposed when said mating relationship is partially disengaged for manipulation to fully disengage and adjust the position of the sleeve member rotatively.

16. In a tank structure adapted for use in the storage of fluids under pressure, a container providing a chamber therein and having an opening in the top wall thereof, said container being equipped with an annular wall about said opening, a closure member of resilient plastic material adapted to sealingly engage the upper edge portion of said annular wall, a support member secured to said closure member and extending upwardly therefrom and having a bore therein, a sleeve member slidable and rotatable in said bore and having a second bore eccentric to the first bore, a bar pivotally carried by the sleeve in said second bore eccentrically to the first bore and having integral eccentric end portions, said bar being shiftable axially relative to said support member, a pair of standards secured to said container extending upwardly from said container adjacent said annular wall and each being provided with an eye therethrough, said eyes being adapted to receive said eccentric end portions therein, and means for pivoting said bar to move said eccentric end portions between lock and release positions within said eyes, disengageable means interconnecting said support member and sleeve to lock them against relative rotation when said bar is shifted in an axial direction by said bar pivoting means to closure sealing relationship, said sleeve and the eccentricity of the bores affording means in cooperation with said resiliency of the closure member whereby the position of said bar and said end portions relative to said eyes and the periphery of said closure member is adjustable.

17. A closure member adapted to sealingly close an opening provided in a tank structure, comprising a cover member adapted to marginally engage said opening in pressure-tight relationship, a support member centrally secured to said cover member, said cover member having a non-concave surface substantially flat to inhibit collection of moisture thereon, said support member having a transversely extending first bore therethrough including a polygonal contour over a portion thereof, a sleeve slidably mounted in said bore and having a second bore eccentric to the first bore and a polygonal contour mating with the first in a plurality of different positions to lock the sleeve in the first bore in a plurality of relative rotational angular positions, and a bar having cam ends thereon slidably and pivotally mounted within said eccentric bore and being equipped with a handle, said bar having spaced-apart cam shaped end portions, one on each side of said support member in normally proximate relation thereto.

18. In a closure member structure adapted to sealingly close an opening provided in a tank structure having removably secured thereto spaced-apart standards having eyes therethrough, a cover member of resilient plastic material having a resilient central portion adapted to seal upon said tank structure about said opening, said resilient central portion acting to compensate for peripheral wear therein and effecting maximum sealing action, a support member integral with said cover member and having a first bore extending transversely therethrough, a sleeve member slidable and rotatable in the first bore and having a second bore eccentric to the first bore, means for locking said sleeve in said bore in a plurality of relative rotational angular positions, said sleeve protruding beyond said first bore in the direction of one of the eyes, a cylindrical bar slidably and pivotally mounted within the second bore and being equipped with cylindrical eccentric end portions extending axially of said bar tangentially therewith, said end portions being adapted to be received within said eyes, one of said end portions having an axial dimension sufficient for movement in the other one of the eyes to permit removal of the other eccentric end portion from said one of the eyes upon axial movement of said bar in a direction away from said one of the eyes, and a handle having an end portion secured to said bar and above said support member to engage said protruding sleeve and displace it axially in said first bore.

19. The combination called for in claim 18 including retaining means on at least one of said eccentric end portions cooperating with said eyes to limit axial shifting of said bar when said handle is substantially perpendicular to said closure member.

20. The combination called for in claim 18 including retaining means on one axial side of said support member extending axially beyond said bore in the direction of said one of said eyes to limit axial shifting of said bar, said retaining means defining an axial recess extending to said first bore to receive said handle end portion to permit axial shifting of said bar when the handle end portion is in a position coincident with said recess.

References Cited by the Examiner

UNITED STATES PATENTS 2,599,527  6/1952  Badger _____ 292—259
2,837,367  6/1958  McMahon _____ 220—55.7 X THERON E. CONDON, *Primary Examiner.*

G. T. HALL, *Assistant Examiner.*